(12) United States Patent
Schremmer

(10) Patent No.: US 9,777,696 B2
(45) Date of Patent: Oct. 3, 2017

(54) METHOD FOR CONTROLLING AN INTERNAL COMBUSTION ENGINE AND IGNITION CONTROL DEVICE FOR SUCH A METHOD

(71) Applicant: BorgWarner Ludwigsburg GmbH, Ludwigsburg (DE)

(72) Inventor: Torsten Schremmer, Ludwigsburg (DE)

(73) Assignee: BORGWARNER LUDWIGSBURG GMBH, Ludwigsburg (DE)

( * ) Notice: Subject to any disclaimer, the term of this patent is extended or adjusted under 35 U.S.C. 154(b) by 93 days.

(21) Appl. No.: 14/798,886

(22) Filed: Jul. 14, 2015

(65) Prior Publication Data

US 2016/0017858 A1    Jan. 21, 2016

(30) Foreign Application Priority Data

Jul. 16, 2014    (DE) .................. 10 2014 109 974

(51) Int. Cl.
*F02P 7/073* (2006.01)
*F02P 9/00* (2006.01)
(Continued)

(52) U.S. Cl.
CPC ............ *F02P 9/007* (2013.01); *F02D 41/266* (2013.01); *F02P 5/1518* (2013.01); *F02P 7/07* (2013.01);
(Continued)

(58) Field of Classification Search
CPC .... F02P 9/007; F02P 9/002; F02P 5/15; F02P 5/04; F02P 5/1512; F02P 5/1518;
(Continued)

(56) References Cited

U.S. PATENT DOCUMENTS 4,231,331 A * 11/1980 Suzuki ................... F02P 5/15
                                                      123/406.48
4,399,802 A *  8/1983 Oshiage ............... F02P 3/0456
                                                      123/406.24
(Continued)

FOREIGN PATENT DOCUMENTS

DE    10 2007 034 390 A1    1/2009
DE    10 2009 024 629 A1    2/2010
(Continued)

*Primary Examiner* — Lindsay Low
*Assistant Examiner* — George Jin
(74) *Attorney, Agent, or Firm* — Boss McKinney & Evans LLP

(57) ABSTRACT

Described is a method for controlling an internal combustion engine, wherein an ignition control device is prompted by control signals of an engine control device to activate an ignition device by means of which an ignition of a fuel-air mixture in a cylinder of the internal combustion engine is affected. It is provided according to this disclosure, that the engine control device communicates a target ignition angle or information about an operating condition of the internal combustion engine to the ignition control device, and the ignition control device sets an operating parameter of the ignition device in dependence on the target ignition angle or the information about the operating condition of the internal combustion engine.

10 Claims, 2 Drawing Sheets

(51) Int. Cl.
*F02P 7/07* (2006.01)
*F02D 41/26* (2006.01)
*F02P 5/15* (2006.01)
*H04L 12/413* (2006.01)
*F02P 7/077* (2006.01)
*F02P 23/04* (2006.01)
*F02D 41/00* (2006.01)

(52) U.S. Cl.
CPC .......... F02P 7/073 (2013.01); H04L 12/4135 (2013.01); *F02D 41/009* (2013.01); *F02P 7/077* (2013.01); *F02P 23/04* (2013.01); *Y02T 10/46* (2013.01)

(58) Field of Classification Search
CPC .... F02P 7/077; F02P 7/00; F02P 7/073; F02P 7/07; F02P 7/0675; F02P 23/04
USPC ........ 123/416, 609, 612, 143 B, 143 R, 596, 123/606, 406.2
See application file for complete search history.

(56) References Cited

U.S. PATENT DOCUMENTS

| | | | | |
|---|---|---|---|---|
| 4,441,479 A | * | 4/1984 | Endo | F02P 3/0884 123/143 B |
| 4,594,987 A | * | 6/1986 | Wataya | F02D 41/182 123/494 |
| 4,922,874 A | * | 5/1990 | DeBiasi | F02P 5/15 123/406.65 |
| 6,050,242 A | * | 4/2000 | Wilkinson | F02P 7/077 123/406.58 |
| 6,530,360 B1 | * | 3/2003 | Kondo | F02B 75/22 123/406.14 |
| 6,651,637 B1 | * | 11/2003 | Morrissette | F02P 7/07 123/594 |
| 2008/0053407 A1 | * | 3/2008 | Maier | F02P 1/04 123/406.58 |
| 2009/0031988 A1 | * | 2/2009 | Shiraishi | F01L 13/0026 123/406.19 |
| 2010/0212633 A1 | * | 8/2010 | Ishikawa | F02P 7/067 123/406.23 |
| 2011/0305998 A1 | * | 12/2011 | Toedter | F02P 3/01 431/2 |
| 2012/0227716 A1 | * | 9/2012 | Schoenfeld | F01N 1/089 123/65 PE |
| 2014/0034032 A1 | | 2/2014 | Dal Re et al. | |

FOREIGN PATENT DOCUMENTS

DE   11 2011 104 869 T5   11/2013
EP         2 290 223 A1    3/2011

* cited by examiner

METHOD FOR CONTROLLING AN INTERNAL COMBUSTION ENGINE AND IGNITION CONTROL DEVICE FOR SUCH A METHOD

RELATED APPLICATIONS

This application claims priority to DE 10 2014 109 974.5, filed Jul. 16, 2014, the entire disclosure of which is hereby incorporated herein by reference in its entirety.

BACKGROUND

The invention relates to a method for controlling an internal combustion engine, wherein an ignition control device is prompted by control signals of an engine control device to activate an ignition device, by means of which an ignition of a fuel-air mixture in a cylinder of the internal combustion engine is affected.

Spark-ignition combustion engines such as gasoline engines are controlled by an engine control device which prompts an ignition control device by means of control signals to activate ignition devices associated with the individual cylinders of the internal combustion engine and thus to effect an ignition of a fuel-air mixture. Spark plugs generating an arc discharge for an ignition can be used as ignition devices, for example, or corona igniters generating a corona discharge for an ignition can also be used.

In conventional methods for controlling an engine, a first edge of a control signal prompts the ignition control device to switch on the respective ignition device, and a second edge of the control signal prompts the ignition control device to switch off the ignition device. Thus, such methods use a pulse as a control signal, wherein the duration of the pulse determines for how long the ignition device is to be activated, thus, for how long an arc or a corona discharge is to be generated, for example.

Performance and consumption of an engine are substantially influenced by the ignition times of the individual cylinders. The goal of each ignition control of an engine is therefore to effect an ignition of the fuel-air mixture that is in each case as close as possible to the optimal ignition time.

SUMMARY

This disclosure provides a way of effecting an ignition of a fuel-air mixture close to the optimal ignition time.

In a method according to this disclosure, the engine control device communicates a target ignition angle or information on the current operating condition of the internal combustion engine to the ignition control device. The ignition control device then sets an operating parameter of the ignition device in dependence on the target ignition angle or the information on the operating condition of the internal combustion engine and subsequently activates the ignition device.

In a method according to this disclosure, the control signals in each engine cycle are preferably transmitted as a sequence of pulses of at least two pulses per cylinder. In other words, the ignition control device thus receives from the engine control device in each engine cycle a pulse sequence of two or more pulses for each cylinder. Depending on a first portion of the pulse sequence, the ignition control device sets an operating parameter of the ignition device, for example the input voltage thereof, and determines the time of activation of the ignition device from a further portion of the pulse sequence. This disclosure thus relates to a method for controlling an internal combustion engine, wherein an ignition control device is prompted by control signals of an engine control device to activate an ignition device, by means of which an ignition of a fuel-air mixture in a cylinder of the internal combustion engine is effected, characterized in that the control signals in each engine cycle are transmitted as a sequence of pulses of at least two pulses. The ignition control device can set an operating parameter of the ignition device in dependence on a portion of the pulse sequence and can determine the time of activation of the ignition device from a further portion of the pulse sequence.

With the method according to this disclosure, precision of controlling the ignition time can be substantially improved. Combustibility of a fuel-air mixture depends in particular on the current engine operating condition and also on the current crankshaft angle. Depending on whether an early or a late ignition time is sought, a greater or lesser amount of energy is therefore to be released by the ignition device in order to effect an ignition. The breakdown voltage, at which an arc discharge forms in the fuel-air mixture, depends on the current crankshaft angle, for example. This can be taken into account, for example, by adjusting the voltage at the ignition electrode of a corona igniter or a spark plug, and the ignition time thus can be controlled more precisely and/or electrode wear can be reduced.

In the method according to this disclosure, the engine control device can communicate to the ignition control device, for example by means of the first portion of the pulse sequence, the current engine operating condition or the crankshaft angle at which the ignition of the fuel-air mixture is to take place. This crankshaft angle is designated hereinafter as target ignition angle. Based on the engine operating condition or the target ignition angle, the ignition control device can then set one or more operating parameters of the ignition device, for example by means of a characteristic curve or a characteristic map.

Based on the second portion of the pulse sequence, the control device can then determine the correct time for activating the ignition device. This time can be communicated to the ignition control device through the position of an edge of the pulse sequence, for example. It can be provided, for example, that the ignition control device activates the control device at the predetermined edge or with a constant time delay after the respective edge. Another possibility is that by evaluating the pulse sequence, the ignition control device itself determines the time at which the ignition device is to be activated. For example, if a target ignition angle is predetermined by the first portion of the pulse sequence, the ignition control device can receive information about the current crankshaft angle through a second portion of the pulse sequence, which enables the ignition control device to calculate the time for activation of the ignition device.

In the method according to this disclosure, the engine control device can instruct the ignition control device when the ignition device is to be activated. However, it is also possible that the engine control device only communicates to the ignition through the control signals as to when the fuel-air mixture in the respective cylinder is to be ignited in the respective cylinder. The ignition control device then determines when the ignition device has to be activated in order to achieve this ignition time. For example, the ignition control device can determine, in dependence on the target ignition angle or the engine operating condition, when the ignition device has to be activated in order to achieve the ignition time set by the engine control device. The ignition control device can determine, for example by means of a characteristic curve or a characteristic map, when the ignition device is to be activated.

In the simplest case, a signal edge can be generated at a defined crankshaft angle; for example, the second edge of the control signals can be generated in each case 100° before the top dead center. The number of the respective edge and the degree value of the crankshaft angle can be freely selected for a given implementation of the method. By means of the control signals, the ignition control device can also be informed in each engine cycle about the current speed of the engine. However, it is also possible that the ignition control device determines the speed from control signals of different cylinders, for example by evaluating the time delay between edges which mark in each case a precisely defined crankshaft angle for the different cylinders. From the speed and the time at which the crankshaft angle has a defined angle, the ignition control device can then calculate when the target ignition angle is achieved.

If the control signals are pulse sequences, the first portion of the pulse sequence, based on which the ignition control device sets one or more operating parameters of the ignition device, occurs normally at a time before the second portion of the pulse sequence to give the ignition control device as much time as possible for setting one or more operating parameters of the ignition device. However, it is also possible that the second portion of the pulse sequence is transmitted prior to the first portion of the pulse sequence, in particular if the second portion of the pulse sequence provides information to the ignition control device about the current crankshaft angle, thus communicates, for example, that the crankshaft angle currently has a predetermined value. For example, the first edge of the pulse sequence thus can mark a defined value of the crankshaft angle, approximately 200° before the top dead center of the ignition.

An advantageous refinement of this disclosure provides that the operating parameter of the ignition device, which is set by the ignition control device, is a primary voltage of the ignition device which is supplied to the ignition device from a voltage transformer. The ignition device can be, for example, a corona igniter for which a primary voltage is generated from an on-board voltage of the vehicle by means of a voltage transformer. This primary voltage is supplied as input voltage to the ignition device which generates a high-frequency alternating voltage therefrom, which high-frequency alternating voltage generates a corona discharge at an ignition tip of the corona device. The frequency of this alternating voltage is an example for another operating parameter that can be set by the ignition control device.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
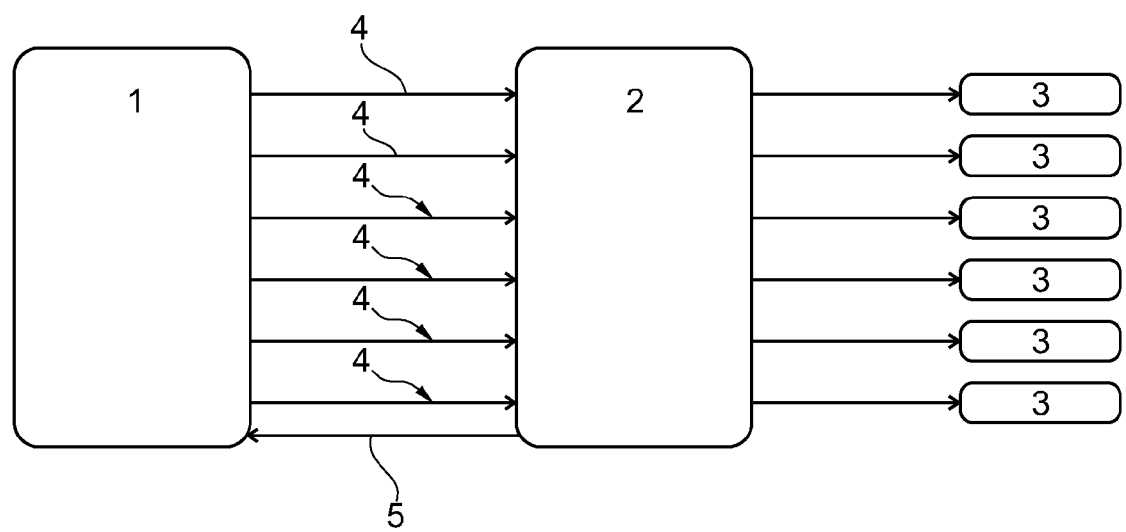
FIG. 1 shows a schematic illustration of a control system of an internal combustion engine.

FIG. 1 schematically illustrates a system for controlling the ignition activity of an internal combustion engine, which can be a gasoline engine, for example. This system includes an engine control device 1, an ignition control device 2 and an ignition device 3 for each cylinder of the internal combustion engine. The engine control device 1 transmits control signals to the ignition control device 2, which signals prompt the ignition control device 2 to activate the ignition devices 3.

In such a system, a separate line 4 from the engine control device 1 to the ignition control device 2 can be provided for each cylinder of the internal combustion engine, as illustrated in FIG. 1. Each of the lines 4 between the engine control device 1 and the ignition control device 2 thus transmits only control signals for a single cylinder of the combustion engine which is associated with the respective line 4.

Figure 2:
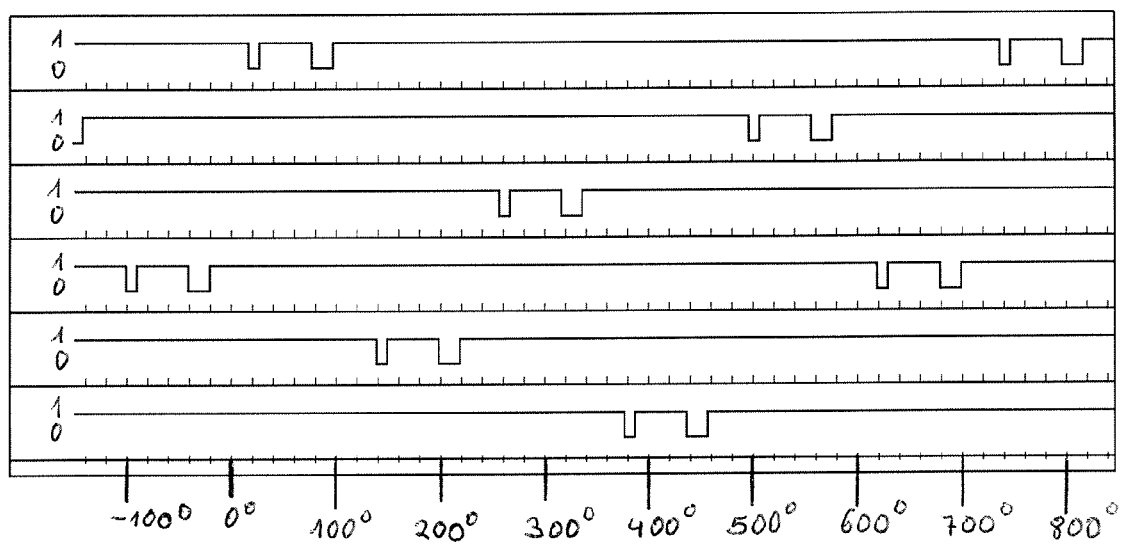
FIG. 2 shows a sequence of control signals for different cylinders of an internal combustion engine.

FIG. 2 illustrates an example for control signals on the individual lines 4 between the engine control device 1 and the ignition control device 2. FIG. 2 shows the voltage level applied to the individual lines 4, in each case as a function of the crankshaft angle of the internal combustion engine. A binary signal is transmitted via the lines 4 so that a differentiation is made only between high and low voltage levels. The firing order of the example shown is 1-5-3-6-2-4, wherein the six illustrated signal paths belong consecutively from top to bottom to the first to the sixth cylinder.

As shown in FIG. 2, the control signals transmitted on the lines 4 are pulse sequences, each of which consist of a plurality of pulses. In the example shown, each pulse sequence consists of two pulses. However, sequences having more than two pulses can also be used as control signals.

The ignition control device 2 sets an operating parameter of the ignition device in dependence on a portion of the pulse sequence and determines the time of activation of the ignition device 3 from a further portion of the pulse sequence.

In the example shown in FIG. 2, the first edge of the signal sequence lies at a crankshaft angle of 100° before the top dead center of the ignition. Thus, by evaluating the position of the first edge of the control signals for the different cylinders, the ignition control device 2 can calculate the current speed of the engine, for example from the time difference of the first edges of control signals for two cylinders which are in immediate succession in the firing order of the engine. However, any other edge of the control signal can be used instead of the first edge in order to mark a constant crankshaft angle.

The second edge or a subsequent edge of the pulse sequence indicates the ignition angle at which an ignition is set to take place, thus communicates a target ignition angle to the ignition control device 2. The ignition control device 2 then sets, in dependence on the target ignition angle, one or more operating parameters of the respective ignition device 3, for example by means of a characteristic curve or a characteristic map. The ignition control device 2 can set, for example, a primary voltage of the ignition device 3, which is supplied to the ignition device 3. The primary voltage of an ignition device 3, for example of a corona ignition device, can be generated from an on-board voltage of the vehicle by means of a voltage transformer. Further operating parameters of a corona ignition device which can be set in dependence on the target ignition angle are frequency or impedance, for example.

The third edge of the signal sequence can indicate, for example, for how long the ignition device is to be activated, thus, for example, for how long a corona discharge is to be generated with a corona ignition device or for how long an arc discharge is to be generated with a conventional spark plug. The fourth edge of the signal sequence can be used to trigger activation of the ignition device 3.

The ignition control device 2 can be additionally connected to the engine control device 1 via a data line 5, for example via a CAN bus. Through this data line 5, the engine control device 1 can also communicate data on the current engine operating condition to the ignition control device 2. However, updating via a CAN bus is possible only in relatively large time intervals so that engine operating data transmitted at high speeds via the data line 5 are not always current, and transmission via the lines 4 is therefore advantageous. If the ignition control device 2 receives data form two transmission paths, error control is advantageously possible. Moreover, the ignition control device 2 can report any occurring malfunctions of the ignition devices 3 to the engine control device 3 via the data line 5. In such a case, the engine control device 1 can avoid certain engine operating conditions.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for controlling an internal combustion engine in which an engine control device communicates control signals to prompt an ignition control device to activate an ignition device, the activation of the ignition device effecting a fuel-air mixture in a cylinder of the internal combustion engine, the method comprising:

the engine control device communicating a target ignition angle or information about an operating condition of the internal combustion engine to the ignition control device;

the ignition control device setting an operating parameter of the ignition device as a function of the target ignition angle or as a function of the information about the operating condition of the internal combustion engine; and wherein the operating parameter of the ignition device is a variable non-zero magnitude of a primary voltage of the ignition device which is supplied to the ignition device from a voltage transformer.

2. The method according to claim 1, wherein the operating parameter is set by means of a characteristic curve or a characteristic map.

3. A method for controlling an internal combustion engine in which an engine control device communicates control signals to prompt an ignition control device to activate an ignition device, the activation of the ignition device effecting a fuel-air mixture in a cylinder of the internal combustion engine, the method comprising:

the engine control device communicating a target ignition angle or information about an operating condition of the internal combustion engine to the ignition control device;

the ignition control device setting an operating parameter of the ignition device as a function of the target ignition angle or as a function of the information about the operating condition of the internal combustion engine; and wherein the engine control device generates an edge of a pulse of the control signals in successive engine cycles at the same crankshaft angle, and the current crankshaft angle is communicated to the ignition control device through this edge.

4. A method for controlling an internal combustion engine in which an engine control device communicates control signals to prompt an ignition control device to activate an ignition device, the activation of the ignition device effecting a fuel-air mixture in a cylinder of the internal combustion engine, the method comprising:

the engine control device communicating a target ignition angle or information about an operating condition of the internal combustion engine to the ignition control device;

the ignition control device setting an operating parameter of the ignition device as a function of the target ignition angle or as a function of the information about the operating condition of the internal combustion engine; and wherein the control signals in an engine cycle are transmitted as a pulse sequence of at least two pulses including a first pulse and a second pulse wherein the first and second pulses each define a leading edge and a trailing edge with the leading edge of the first pulse defining a first edge, the trailing edge of the first pulse defining a second edge, the leading edge of the second pulse defining a third edge and the trailing edge of the second pulse defining a fourth edge; the third edge defining for how long the ignition device is to be activated.

5. The method according to claim 4, wherein a portion of the pulse sequence, in dependence of which the ignition control device sets the operating parameter of the ignition device, indicates a target ignition angle of the crankshaft or information on the operating condition of the internal combustion engine.

6. The method according to claim 4, wherein the ignition control device determines the current crankshaft angle from a portion of the pulse sequence.

7. The method according to claim 3 wherein the ignition control device determines a speed of the engine from control signals for different cylinders of the internal combustion engine by evaluating the time delay between the edges which correspond to a defined crankshaft angle for the different cylinders.

8. The method according to claim 1, wherein the fuel-air mixture is ignited by the ignition device by means of a corona discharge.

9. The method according to claim 1, wherein the ignition control device has a separate input for each cylinder of the internal combustion engine and receives control signals for the respective cylinder via this input.

10. The method of claim 4 wherein the fourth edge defines when the ignition device is triggered.

* * * * *